United States Patent [19]

Ferris et al.

[11] Patent Number: 5,074,570
[45] Date of Patent: Dec. 24, 1991

[54] SHOPPING CART WITH SLIDABLE SIDE GATE

[75] Inventors: Gregory W. Ferris; Dewey J. Waterman, both of Battle Creek, Mich.

[73] Assignee: United Steel & Wire Company, Mich.

[21] Appl. No.: 424,409

[22] Filed: Oct. 20, 1989

[51] Int. Cl.$^5$ .............................................. B62D 39/00
[52] U.S. Cl. .............................................. 280/33.995
[58] Field of Search ...................... 280/33.991, 33.995, 280/33.996, 33.997, 33.998, 639, 47.41, 33.992

[56] References Cited

U.S. PATENT DOCUMENTS

| | | | |
|---|---|---|---|
| 3,245,498 | 4/1966 | Stanley et al. | 280/33.995 |
| 3,443,665 | 5/1969 | Zschaeck | 280/33.995 |
| 3,503,622 | 3/1970 | Romero | 280/33.995 |
| 3,815,932 | 6/1974 | Ruger | 280/33.995 |
| 4,118,044 | 10/1978 | Celms | 280/33.995 |

FOREIGN PATENT DOCUMENTS

1532166  7/1968  France ........................... 280/33.995

Primary Examiner—Andres Kashnikow
Assistant Examiner—Richard Camby
Attorney, Agent, or Firm—Flynn, Thiel, Boutell & Tanis

[57] ABSTRACT

A shopping cart having a side-opening gate arrangement associated with one of the basket side walls. The gate at its upper edge has a latch arrangement which cooperates with the adjacent side walls to simply but securely maintain the gate in its closed position. The lower edge of the gate is disposed in guided slidable engagement with guide structure which is fixed to the basket adjacent the opposite lower corners of the opening. The gate is opened by the cashier lifting the gate a small amount to release the latch, slightly pulling it forwardly and then permitting the weight of the gate to move it downwardly into an opened position, under the control of the cashier's hand, so that the gate is generally suspended below the bottom wall of the basket.

9 Claims, 5 Drawing Sheets

SHOPPING CART WITH SLIDABLE SIDE GATE

FIELD OF THE INVENTION

This invention relates to a wheeled shopping cart such as used in supermarkets and the like and, in particular, to an improved cart having a side gate which moves generally vertically between closed and open positions to facilitate cashier-unloading of the cart.

BACKGROUND OF THE INVENTION

Numerous shopping carts as used in supermarkets and the like, including those known as an "over-the-counter" cart which employs an upwardly opening basket constructed of wire rod, the basket having a relatively high bottom wall disposed so as to be at an elevation closely adjacent to and preferably slightly above the elevation of a checkout counter. In an attempt to facilitate unloading of the goods from the basket onto the counter, either by the customer or the cashier, such carts have conventionally been provided with an openable front gate. By slightly manually lifting the front gate to release a latch, the gate can then be hingedly swung outwardly and downwardly to provide access to the interior of the basket through a front opening therein. In some of these known carts, the gate has additionally been slidably moveable into a storage position directly beneath the bottom wall of the basket when the gate is opened. Examples of known carts of this general type are illustrated by U.S. Pat. Nos. 3,245,498, 3,503,622, 3,815,932 and 4,118,044. While carts of this general type have been extensively utilized for a number of years, nevertheless it has also been recognized that such carts do not always provide optimum convenience for cashier unloading, particularly when using counters employing price scanners, since such carts and the required counter length can result in undesired and sometimes uncomfortable cashier movements in order to remove merchandise from the basket and then pass it over the scanner.

Another example of a shopping cart having an openable front gate is illustrated by U.S. Pat. No. 3,443,665. The cart of this latter patent employs a front gate which, when released, drops generally straight down so as to be generally suspended below the bottom wall when in the opened position. The gate of this cart, however, in addition to being front opening, is also designed for cooperation with an automated counter which, through a suitable electric-type actuator, is designed to release and lower the gate when the cart is positioned adjacent the end of the counter. When in the closed position, the gate is secured by a latching structure which cooperates between the lower edge of the gate and the basket. This gate arrangement is undesirable not only due to its front orientation, but also due to its being wholly unsuitable for manual actuation and control. The provision of a bottom latch also makes the gate more susceptible to being accidentally opened, and hence can permit accidental discharge of goods from the basket.

In an attempt to provide improved cashier-unloading of goods from the basket, one shopping cart has been introduced which employs a basket sidewall having an unloading opening formed therein, and the side wall is provided with an openable gate for normally closing off this opening. The gate is manually actuated (i.e., opened and closed) by the cashier. This gate, however, is hingedly supported about a generally horizontal hinge pin at one of its lower corners to the basket side wall, whereby opening of the gate requires it to be swung generally upwardly through about a 90° angle in generally parallel relationship to the side wall. Closing of the gate involves a downward swinging movement. With this arrangement, however, there is the inherent danger that the opened gate may be accidentally jarred or moved when the cashier is unloading the goods, and hence such may cause the gate to fall downwardly onto the cashier's hand or arm. Further, it is believed that the required upward and sideward swinging of the gate in order to move it into an open position is a less comfortable and more complex movement as required by the cashier. Further, the gate always remains located above the bottom wall of the basket when in the open position, thereby increasing the risk of accidental closing and restricting the usable basket space and basket accessibility.

Accordingly, it is an object of the present invention to provide an improved shopping cart having a side-opening gate, which cart is believed to improve upon the structural and operational characteristics of carts of the above type, and to provide improved performance characteristics with respect to permissible cashier unloading of the goods from the basket.

More specifically, the present invention relates to an improved shopping cart having a side-opening gate arrangement associated with one of the basket side walls. The gate at its upper edge has a latch arrangement which cooperates with the adjacent side walls to simply but securely maintain the gate in its closed position. The lower edge of the gate is disposed in guided slidable engagement with guide structure which is fixed to the basket adjacent the opposite lower corners of the opening. The gate can be easily and simply opened by the cashier lifting the gate a small amount to release the latch, slightly pulling it forwardly and then permitting the weight of the gate to move it downwardly into an opened position, under the control of the cashier's hand, so that the gate is generally suspended below the bottom wall of the basket. The gate can be closed by the cashier engaging the upper edge of the gate and lifting it upwardly to its full extent, at the same time slightly pushing the gate inwardly at its upper position, and then releasing the gate so that it latches to the adjacent side wall.

With the improved cart and gate arrangement of the present invention, the cart can be constructed in a simple and economical manner, the cart possesses desirable strength and rigidity, the gate can be simply and safely operated, the gate when in an opened position provides optimal accessibility to the interior of the basket by the cashier, and the gate can be repeatedly operated in a dependable and maintenance free manner.

Other objects and purposes of the improved cart of this invention will be apparent to persons familiar with structures of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "upwardly" and "downwardly" will also refer to the normal vertical directions associated with the cart basket and gate, the gate being in an upper position when closed and in a lower or downward position when open. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

Figure 1:
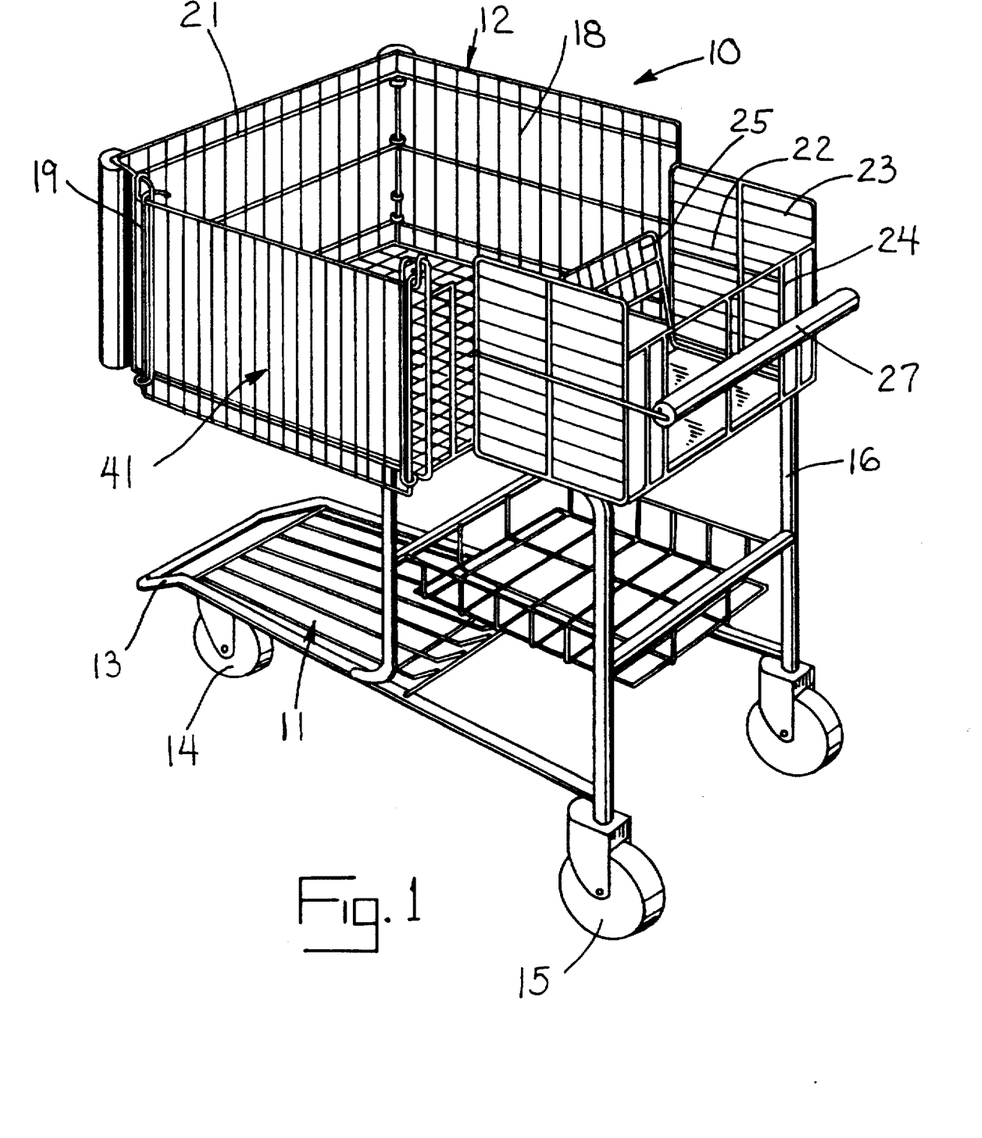
FIG. 1 is a perspective view of a shopping cart employing the improved side gate arrangement of the present invention, the gate being illustrated in its closed position.
Figure 2:
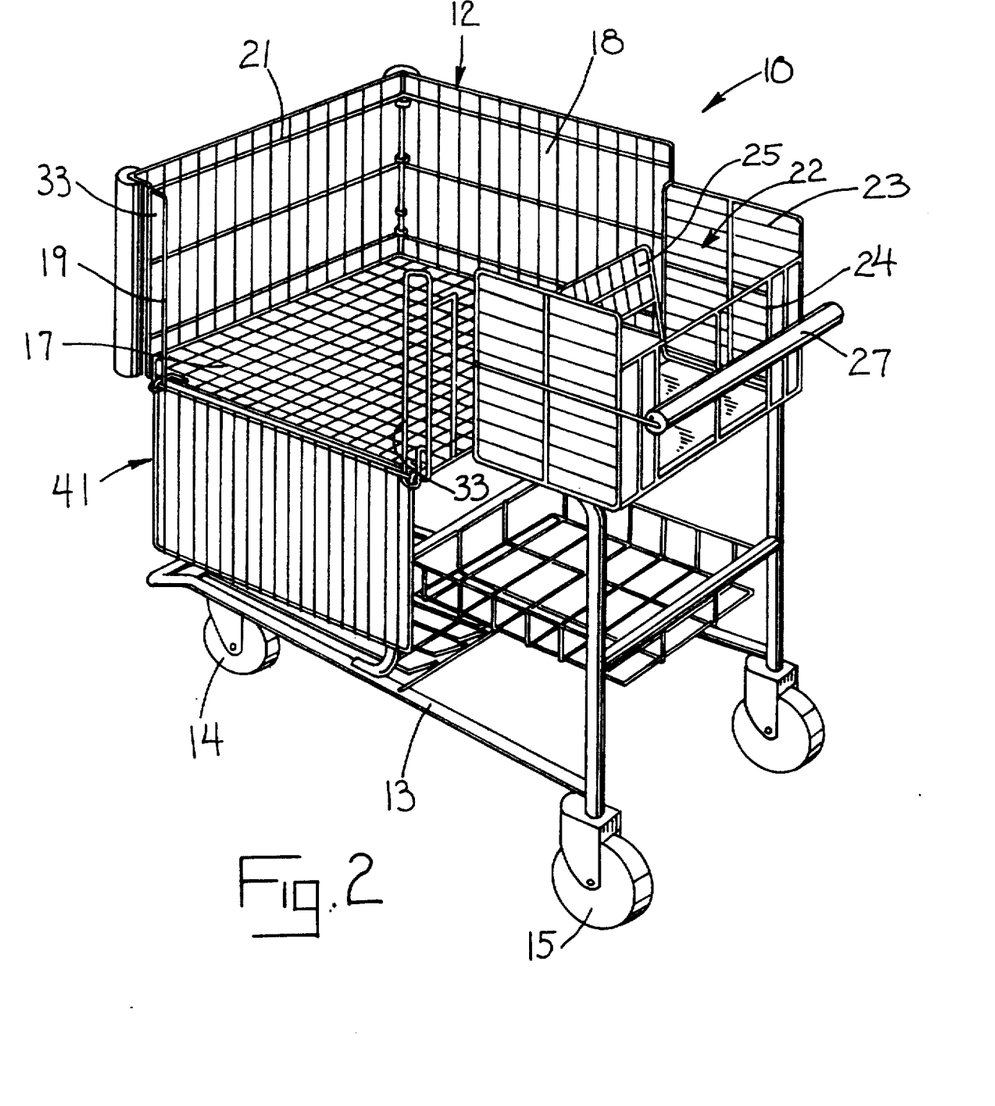
FIG. 2 is a view similar to FIG. 1 but illustrating the gate in its open position.

Referring to FIGS. 1 and 2, there is illustrated a supermarket-type shopping cart 10 having a wheeled base 11 on which is supported an upwardly-opening basket 12 adapted for storage and transport of goods such as groceries or the like.

The base 11 includes a generally rearwardly-opening U-shaped frame 13 having side legs which diverge as they project rearwardly so as to permit the cart to nest with like carts. The base frame is normally supported adjacent its forward end by a pair of casters 14, and a pair of wheels 15 are provided adjacent the rearward ends of the side legs. A suitable basket support structure including a plurality of tubular uprights 16 are secured to the side legs of the frame and project upwardly therefrom for attachment to and support of the basket 12. This basket support structure enables the basket to be supported in a forwardly projecting cantilevered fashion so that the basket is spaced vertically upwardly from but projects generally forwardly over the U-shaped base frame.

The basket 12 includes a bottom wall 17 rigidly joined to approximately parallel upright side walls 18 and 19 and an upright front wall 21. The rear of the basket is normally disposed so as to open into a conventional baby seat structure 22, the latter being defined between opposed side walls 23 and a rear wall 24. The baby seat arrangement typically has a movable baby seat backrest 25 which can be disposed to project generally upright between the basket and baby seat arrangement, or laid downwardly to provide open communication between the basket and baby seat arrangement. A conventional handle 27 is also fixedly secured either directly to the baby seat or basket arrangement, or to the basket support structure, and projects rearwardly for manual gripping by the cart operator.

As are conventional, the basket and baby seat is typically formed from wire rod disposed in intersecting and generally perpendicular relationship, the wire rod being suitably welded together to define generally rectangular meshlike walls. The frame is typically formed from hollow tubular stock.

The basket in the illustrated embodiment is of the type conventionally known as an "over-the-counter" cart in that the bottom wall 17 of the basket is disposed approximately horizontally and is disposed at an elevation close to or slightly above the elevation of the checkout counter surface.

In addition, the basket is typically hingedly mounted adjacent the rear lower corners thereof so that it can be pivoted upwardly through an angle of about 90° so as to partially telescope over the baby seat, such being referred to as the nesting position of the basket, same being used for storage purposes.

Shopping carts having functional and constructional features similar to those outlined above are conventional, whereby further description thereof is believed unnecessary.

Figure 3:
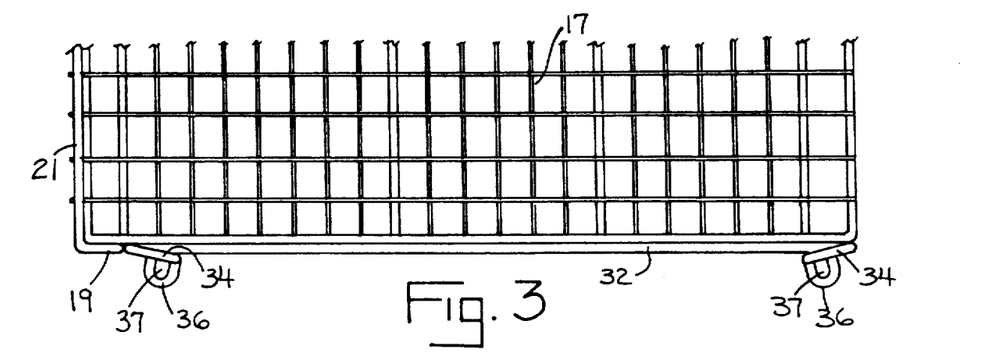
FIG. 3 is a fragmentary top view of the side portion of the basket having the gate opening, the gate being removed for clarity of illustration.
Figure 4:
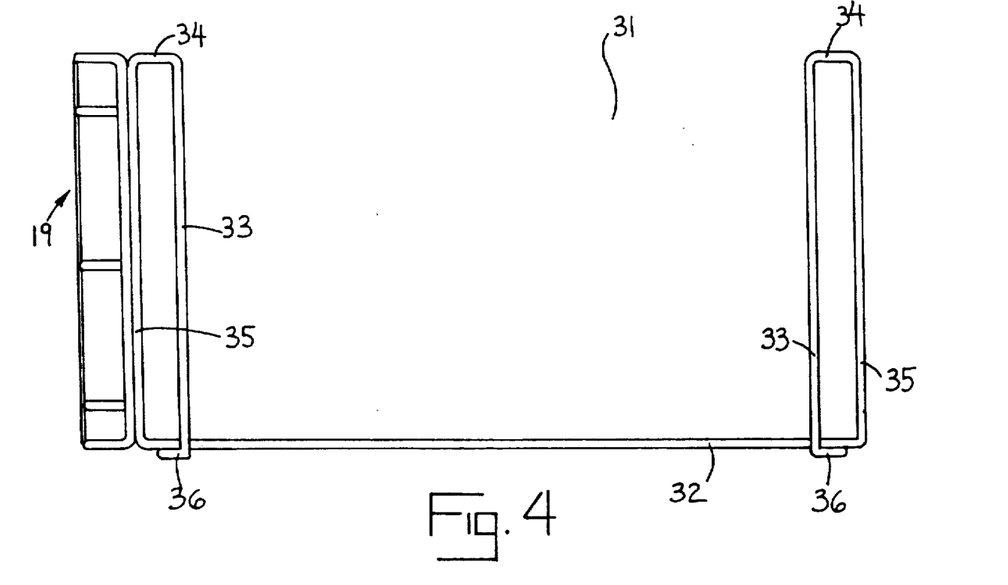
FIG. 4 is a side elevational view of the structure shown in FIG. 3, the gate again being removed for clarity of illustration.
Figure 5:
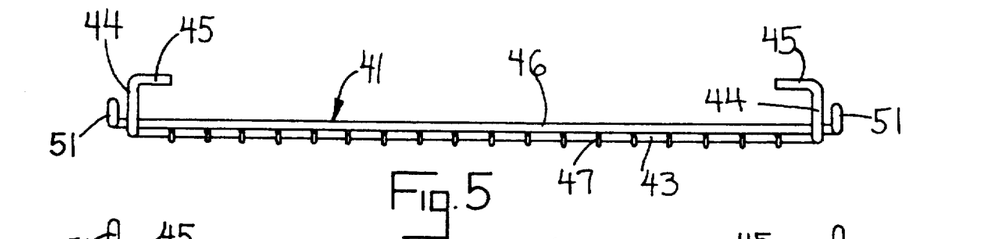
FIG. 5 is a top view of the gate, shown separated from the basket for clarity of illustration.

Considering now FIGS. 2–4, the basket side wall 19 has an enlarged opening 31 formed therethrough. This opening 31 extends upwardly from the lowermost side wall wire rod 32, the latter being substantially co-planer with the bottom wall 17, so that the opening 31 thus freely opens upwardly through the upper edge of the side wall. This opening 31 also extends over substantially the entire length of the side wall 19 so as to provide the cashier convenient access to substantially the entirety of the basket compartment.

Each vertical edge of the basket opening 31 is defined by a vertically elongated side wire or rod 33 which, at its lower end is positioned just outside of and intersectingly contacts the bottom rod 32. The side rod 33 at its upper end is fixedly and here integrally joined through a right angle bend to a short top rod 34 which slopes inwardly toward the vertical plane containing the bottom rod 32. Short top rod 34 in turn is fixedly and here integrally joined through a generally right angle bend to a downwardly extending vertical side rod 35 which extends generally parallel to the side rod 33. Side rod 35 is disposed in the vertical plane of the bottom rod 32 and, in fact, this side rod 35 at its lower end is fixedly and here integrally joined through a 90° bend to the bottom rod 32. The bottom rod 32 and the generally upright elongate loops defined by the rods 33–35 are all formed integrally by being bent from one elongate rod or wire element. The side opening wire 33, at its lower free end just below its fixed intersection with the bottom rod 32, is bent horizontally outwardly and is then bent to define a generally horizontal closed loop 36. The loop 36 projects outwardly away from the basket side wall and is disposed generally at and more preferably just slightly below the bottom rod 32. The loop 36 defines an opening 37 vertically therethrough, which opening is sized so as to be slightly greater than a standard wire rod, as explained below. The openings 37 as defined by the pair of loops 36 are disposed slightly sidewardly spaced from the bottom rod 32.

The cart also includes a gate 41 (FIGS. 2, 5, 6 and 7) which is slidably supported on the basket for vertical displacement between a raised position wherein it closes the opening 31 and a lowered position wherein it is suspended downwardly below the basket so as to open or uncover the opening 31.

Figure 6:
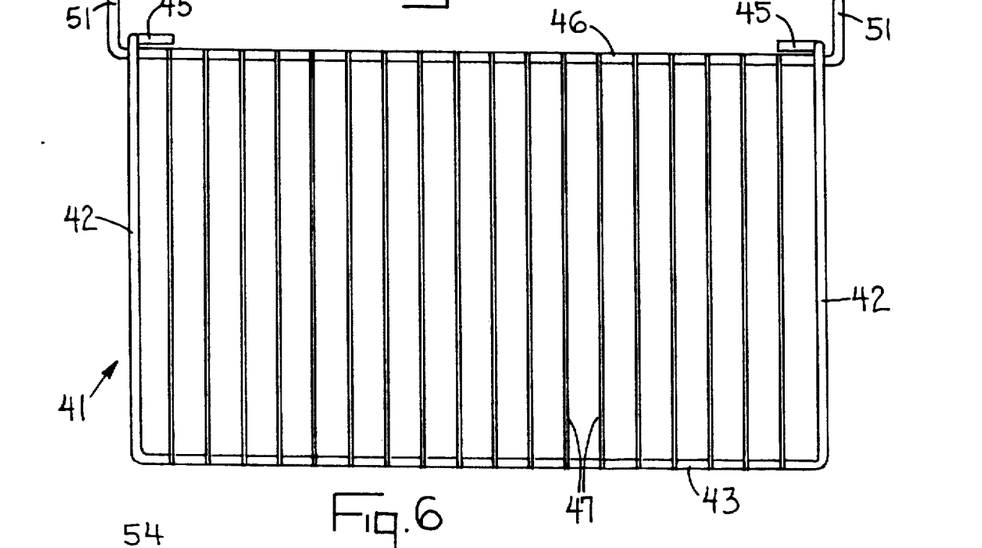
FIG. 6 is an elevational view of the gate.

As illustrated by FIG. 6, the gate 41 is of a generally rectangular configuration formed by generally vertical and horizontal wire rods which approximately perpendicularly intersect and are suitably fixedly secured, such as by welding. The gate has vertical sides defined by vertical side rods 42 which are fixedly and here integrally joined through right angle bends to a generally horizontal bottom rod 43 which defines the lower edge of the gate. Each of the side rods 42 at the upper end thereof is bent horizontally inwardly so as to define a generally horizontally-oriented L-shaped guide 44-45. This guide includes a first leg portion 44 which projects horizontally inwardly from the upper end of the side leg 42 and which is then bent through a right angle for merger with a further leg portion 45 which projects in generally parallel relationship to the side wall. This latter leg portion 45 defines the free end of the wire rod. The two L-shaped guides 44-45 as defined adjacent the opposite vertical edges of the gate are directed generally toward one another in opposed relationship, and in addition function as stops as explained below.

Gate 41 also includes a top wire or rod 46 which extends generally horizontally in approximately parallel relationship with the bottom rod 43. This top rod 46 perpendicularly overlaps the side rods 42 adjacent the upper ends thereof, which overlap points are suitably fixedly secured, as by welding. A plurality of intermediate rods 47 extend generally vertically between the top and bottom rods 43 and 46, and are disposed in generally parallel relationship. Rods 47 have opposite ends thereof fixedly secured to the top and bottom rods, as by welding.

Figure 7:
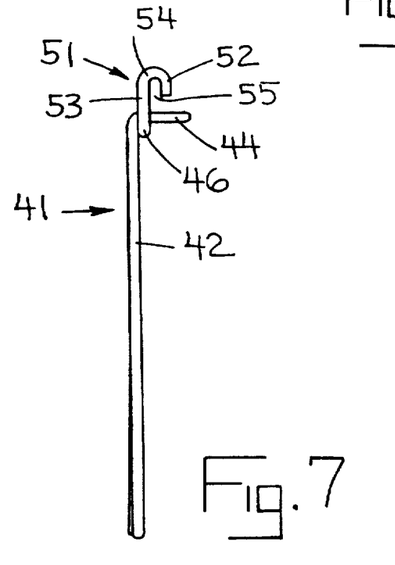
FIG. 7 is an edge view of the gate.

The gate 41 is also provided with a pair of latch hooks 51 fixedly mounted thereon, which hooks are disposed adjacent the opposite upper corners of the gate. The latch hook 51 is of a generally downwardly-opening U-shaped configuration and is defined by generally parallel side legs 52 and 53 which are joined together by a rounded top bight 54. The U-shaped configuration of the latch hook 51 is disposed within a generally vertical plane which is oriented in substantially transverse or perpendicular relationship relative to the basket side wall, and the side leg 52 is disposed innermost and terminates in a lower free end so as to provide free access to the downwardly opening slot 55 defined between the legs 52 and 53. This slot 55 has a width which is sized so as to freely accommodate a conventional wire rod associated with the top of the basket side wall, as explained below. The other side leg 53 of the hook 51 projects vertically downwardly through a greater extent and is fixedly and here integrally joined, through a suitable right-angle bend, to the outer end of the top rod 46. The hook 51, as illustrated by FIGS. 6 and 7, is disposed directly outwardly from the respectively adjacent side rod 42, and projects generally upwardly from the top rod 46.

The sideward spacing between the pair of latch hooks 51 is slightly greater than the sideward spacing between the vertical side rods 33 defining the basket opening 31, whereby the latch hooks 51 can hence be engaged over the top rods 34 when the gate is in the closed position. Similarly, the sideward spacing between the side rods 42 of the gate correspond to the sideward spacing between the openings 37 defined by the guide loops 36, whereby these side rods 42 are hence disposed so as to vertically slidably project through the guide openings 37 so as to be confined by the respective loops 36.

Figures 8, 9, 10:
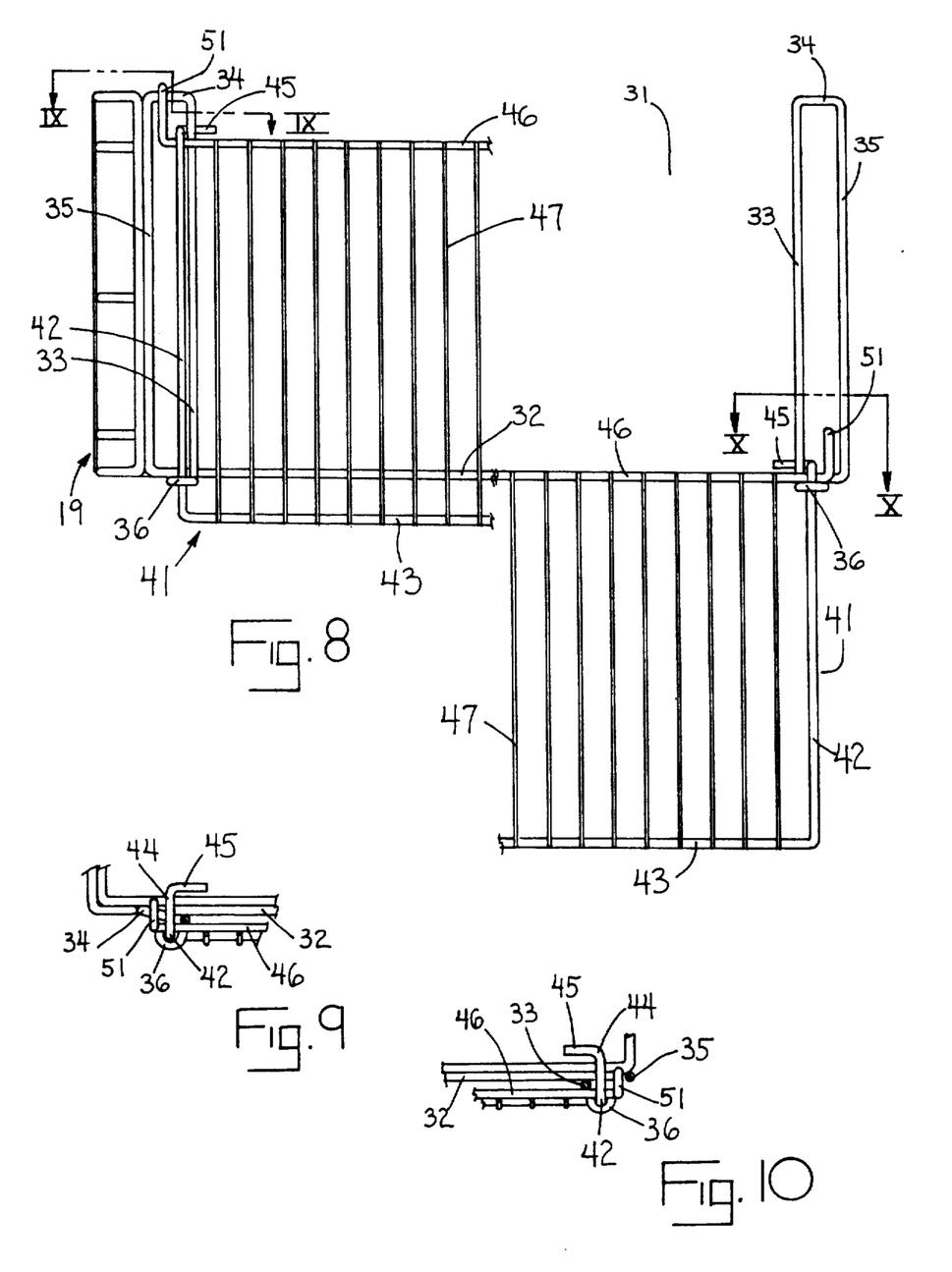
FIG. 8 is a side elevational view showing the gate mounted on the basket, the gate being illustrated in both its closed and open positions.
FIGS. 9 and 10 are fragmentary views taken along lines IX—IX and X—X, respectively, in FIG. 8.

When the gate is structurally connected to the basket, the gate side rods 42 are slidably confined within the loops 36 so that the bottom rod 43 of the gate is permanently disposed below the loops 36 and, when the gate is closed, this bottom rod 43 is at an elevation close to but generally slightly below the bottom wall of the basket. At the same time, the L-shaped stops 44-45 adjacent the upper corners of the gate each has its leg 44 projecting inwardly between the vertical rods 33 and 35 so that the rear leg 45 is disposed directly rearwardly of but normally spaced inwardly from the vertical side rod 33, substantially as illustrated by FIG. 9. At the same time, the adjacent U-shaped latch hook 51 is adapted to be downwardly engaged over the top wire 34.

When the gate 41 is in the closed position as illustrated by FIGS. 8 and 9, the top hook 51 is downwardly engaged over the adjacent top rod 34 of the side wall, and the respectively adjacent L-shaped stop 44-45 is positioned slightly downwardly from the top rod 34 and disposed so that its rear leg 45 is positioned directly inwardly from the side edge rod 33. Further, the bottom gate rod 43 is spaced a small distance below the loops 36.

To open the gate 41, the cashier grasps the gate adjacent the upper edge thereof, such as by manually grasping the top rod 46, and then lifts it upwardly a small extent so that the rear leg 52 of the latch hook 51 releases the top rod 34. The cashier then pivots the top of the gate slightly outwardly away from the basket side wall (this being permitted by limited relative looseness between the loops 36 and the lower ends of the side gate rods 42) until the latch hooks 51 are moved forwardly from the rods 34, during which movement the rear stop leg 45 moves toward the edge opening rod 33 and hence limits the outward movement of the gate. The cashier can then permit the gate to be lowered, by gravity but preferably under control of the cashier's hand, until the legs 44 of the L-shaped stops abut the bottom rod 32, as illustrated by FIGS. 8 and 10, thereby defining the open position of the gate. In this open position, the top rod 46 of the gate is substantially flush with the bottom wall of the basket.

When closing of the gate is desired, the cashier activates the gate in generally the reverse sequence. That is, the cashier grips the upper edge of the gate and lifts it upwardly and either slightly tilts the upper edge of the gate slightly outwardly or permits the curvature of the latch hooks to effectively cam the upper edge of the gate outwardly when passing upwardly over the top rods 34. The cashier then moves the top edge of the gate slightly inwardly and then permits the gate to be lowered so that the latch hooks 51 again latchingly engage the top rods 34.

With the construction of the present invention, the gate including all of the stops and latch hooks mounted thereon are all joined together, such as being formed from wire rod and being fixedly secured as by welding, to form a rigid and unitary structure which is free of separate movable locking pawls or the like, thereby providing increase economy of manufacture and increased durability and reliability in operation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart having a wheeled base and an upwardly-opening cantilevered basket supported from said base in upwardly spaced relationship thereto, the basket including a bottom wall rigidly joined to a pair of upwardly projecting side walls and to a front wall which extends transversely between and is generally rigidly joined to the side walls, and an operator handle extending transversely of the cart in rearwardly spaced relation from the rear of the basket, comprising the improvement wherein one said side wall has a large access opening formed therein, said access opening extending upwardly through the upper edge of the side wall and having a lower edge disposed in close proximity to the bottom wall, said access opening extending over a majority of the length of the respective side wall and being defined between generally parallel and generally vertically-extending side elements, and manually-actuatable gate means vertically slidably supported on said basket for movement between (1) a raised closed position wherein the gate means is generally vertically oriented and vertically overlaps and closes off said access opening and (2) a lowered open position wherein the gate means is suspended generally vertically downwardly below the bottom wall of the basket so as to uncover said access opening, said basket including guide means fixedly mounted thereon adjacent the lower edge of said access opening for vertically slidably guiding said gate means between said closed and open positions, and latch means including a pair of latch members fixedly secured to said gate means adjacent upper corners thereof for latching engagement with latch parts which are fixed to said one side wall in the vicinity of the upper edge thereof when the gate means is in said closed position, the latch parts comprising generally horizontally extending rod parts which are disposed adjacent the upper edge of said one side wall and are positioned closely adjacent the opposite sides of the access opening, and said latch members comprising a pair of generally U-shaped hooks which open downwardly and which are fixed to said gate means adjacent the opposite upper corners thereof, said hooks projecting generally transversely relative to said one side wall and being disengagable from said one side wall by limited upward lifting of the gate means relative to said one side wall away from the closed position.

2. A cart according to claim 1, wherein said gate means is constructed of wire rod and has a rigid and unitary structure which is free of relatively moving parts or components.

3. A cart according to claim 1, including guide means fixed to said gate means to assist in guidably controlling the movement thereof, said guide means including a pair of generally L-shaped guide members which are fixed to said gate means adjacent the upper corners thereof and which project generally inwardly from the gate means so as to terminate in stop portions which are positioned inwardly of the respective side elements so as to permit limited outward movement of the upper edge of the gate means away from said one side wall after the gate means has been unlatched.

4. A cart according to claim 3, wherein the L-shaped guide members also function as stops for abutment with an element which is fixed to the basket and defines the lower edge of the access opening when the gate means is disposed in the open position.

5. A cart according to claim 4, wherein the guide means includes a pair of substantially closed guide loops which are fixed to the basket and project outwardly from said one side wall in the vicinity of the lower edge thereof, the loops defining guide openings extending vertically therethrough, and the gate means having a pair of generally parallel and sidewardly spaced guide rod members which extend vertically and project vertically through the respective openings defined by the respective guide loops, said gate means having a bottom element which is fixed to and extends transversely relative to the guide rod members and is permanently positioned below said loops.

6. A cart according to claim 3, wherein the guide means includes a pair of substantially closed guide loops which are fixed to the basket and project outwardly from said one side wall in the vicinity of the lower edge thereof, the loops defining guide openings extending vertically therethrough, and the gate means having a pair of generally parallel and sidewardly spaced guide rod members which extend vertically and project vertically through the respective openings defined by the respective guide loops, said gate means having a bottom element which is fixed to and extends transversely relative to the guide rod members and is permanently positioned below said loops.

7. A cart according to claim 6, wherein said vertical guide rod members define the opposite vertical edges of the gate means, said bottom element defines a rod which extends transversely across the gate means and defines the bottom edge thereof, said L-shaped guide members are fixed to and project inwardly from the upper ends of the vertical guide rod members, said gate means having a top rod extending transversely thereacross and projecting outwardly beyond the vertical guide rod members, and said latch hooks being fixed to the outer ends of the top rod and projecting upwardly therefrom.

8. A cart according to claim 3, wherein said one side wall has a vertically elongate slot formed therein and extending between upper and lower edges of said one side wall, said slot being disposed closely adjacent one side edge of the access opening but separated therefrom by a respective said vertical side element as fixedly associated with the side wall, and said L-shaped guide member projecting inwardly from the gate means and inwardly through the respective slot.

9. In a shopping cart having a wheeled base including a generally rearwardly-opening U-shaped base frame, an upright basket support structure fixed to the base frame and projecting upwardly therefrom adjacent the rear end thereof, and an upwardly-opening basket supported on said upright support structure and projecting forwardly in upwardly spaced but generally overlying relationship to the base frame, the basket being constructed of generally transversely intersecting wire rod which is fixedly connected, the basket including a bottom wall fixedly related relative to a pair of generally parallel and upwardly projecting side walls which are rigidly joined by a front wall which is also fixed to the bottom wall, and a handle extending transversely of the cart adjacent a rearward end thereof, the improvement comprising:

one of the side walls of said basket having an enlarged and substantially rectangular access opening formed therethrough, said access opening extending upwardly through an upper edge of the side wall and extending downwardly so that the bottom edge of the access opening is disposed in close proximity to the bottom wall of the basket, said access opening having a width which extends over a majority of the length of the side wall;

gate means vertically slidably supported on said basket and being vertically displaceable between a raised position wherein the gate means substantially overlies and closes off the access opening and a lower position wherein the gate means is suspended generally vertically downwardly from and below the bottom wall so as to uncover the access opening;

said gate means comprising a rigid and unitary gate which is of a generally rectangular configuration and which is of a size which approximately corresponds to the size of the access opening, said gate means being constructed of a plurality of parallel and transversely intersecting rods which are suitably fixedly secured together;

guide means fixed to said basket for vertically slidably guiding the gate means, said guide means including a pair of looplike guide elements which are fixed to the basket in the vicinity of the lower corners of the access opening, each said guide element having a guide opening extending vertically therethrough;

said gate means having outer generally parallel and generally vertically extending side rods, each of the side rods being vertically slidably guided through a respective one of the guide elements, said gate means also having a generally horizontally extending bottom edge rod which is disposed below the guide elements and is fixedly secured to the side rods;

said basket having a first elongate edge rod extending generally vertically along each side edge of the access opening, and a second edge rod extending generally parallel to and slightly spaced from said first edge rod so as to define a narrow but vertically elongate slot therebetween which extends over a majority of the height of the side wall, and a cross rod fixed to said first and second edge rods in the vicinity of the upper ends thereof;

said gate means having adjacent each upper corner thereof an upwardly projecting latch hook which is of a generally downwardly-opening U-shaped configuration, said latch hook being adapted for downward latching engagement over the cross rod; and said gate means also having a guide member fixed thereto adjacent each upper corner thereof and projecting inwardly therefrom through the respectively adjacent slot, said guide member having an inner part which projects transversely behind said first edge rod and is inwardly spaced therefrom by a predetermined distance when the gate means is in a closed and latched position.

* * * * *